United States Patent
Valdez

(10) Patent No.: US 9,526,239 B2
(45) Date of Patent: Dec. 27, 2016

(54) VIRTUAL HUNTING DEVICES AND USES THEREOF

(71) Applicant: Ronnie Valdez, Denver, CO (US)

(72) Inventor: Ronnie Valdez, Denver, CO (US)

(*) Notice: Subject to any disclaimer, the term of this patent is extended or adjusted under 35 U.S.C. 154(b) by 262 days.

(21) Appl. No.: 14/262,586

(22) Filed: Apr. 25, 2014

(65) Prior Publication Data
US 2014/0323187 A1    Oct. 30, 2014

Related U.S. Application Data

(60) Provisional application No. 61/815,876, filed on Apr. 25, 2013.

(51) Int. Cl.
| | | |
|---|---|---|
| *F41G 3/26* | (2006.01) | |
| *A01M 31/00* | (2006.01) | |
| *G03B 29/00* | (2006.01) | |
| *G03B 13/02* | (2006.01) | |
| *F41A 33/00* | (2006.01) | |

(52) U.S. Cl.
CPC .............. *A01M 31/00* (2013.01); *G03B 13/02* (2013.01); *G03B 29/00* (2013.01); *F41A 33/00* (2013.01)

(58) Field of Classification Search
None
See application file for complete search history.

(56) References Cited

U.S. PATENT DOCUMENTS

| | | | | |
|---|---|---|---|---|
| 4,989,024 A | * | 1/1991 | Myers | G03B 29/00 396/373 |
| 5,020,262 A | * | 6/1991 | Pena | G03B 29/00 396/432 |
| 2004/0031184 A1 | * | 2/2004 | Hope | F41C 27/00 42/111 |
| 2005/0246910 A1 | * | 11/2005 | Mowers | F41G 1/467 33/266 |
| 2006/0201046 A1 | * | 9/2006 | Gordon | F41A 33/00 42/119 |
| 2012/0262484 A1 | * | 10/2012 | Gottfeld | G09B 5/065 345/632 |
| 2013/0040268 A1 | * | 2/2013 | Van Der Walt | F41A 33/06 434/16 |
| 2013/0288743 A1 | * | 10/2013 | Hunt | F41G 11/004 455/556.1 |

* cited by examiner

*Primary Examiner* — Jason Yen
(74) *Attorney, Agent, or Firm* — Faegre Baker Daniels LLP

(57) ABSTRACT

Embodiments of the present invention concern a virtual hunting apparatus that employs an imaging device mounted on top of the barrel of a simulated firearm such as a rifle or other toy. A cable can be used to connect the imaging device to the trigger of the simulated firearm. An imaging device can run a variety of applications and play videos. Pulling the trigger of the simulated firearm takes a picture of a target animal, records a video or plays a video of interest within the imaging device, without displacing a bullet or pellet to injure or kill the target animal.

15 Claims, 4 Drawing Sheets

VIRTUAL HUNTING DEVICES AND USES THEREOF

CROSS-REFERENCE TO RELATED APPLICATIONS

This application claims the benefit of U.S. Provisional Patent Application Ser. No. 61/815,876, filed on Apr. 25, 2013, which is incorporated herein by reference in its entirety for all purposes.

FIELD

Embodiments of the invention generally relate to simulated hunting and in particular to using a simulated firearm to provide a virtual hunting experience.

BACKGROUND

Game hunting is a popular recreational pastime in the United States and many other countries worldwide. But as animals (especially endangered animal species) become fewer, stricter regulations apply to killing an animal. In addition, some hunters prefer to seek out a target but not to kill it.

SUMMARY

According to some embodiments, a virtual hunting device includes an imaging device coupled to a firearm or to an imitation firearm. The imaging device displays images to simulate a hunting experience. The images may be captured using a camera integrated into the imaging device or the images may be previously stored images stored on a local memory. In some embodiments, additional features such as a cross-hair or a bull's eye may be superimposed on the images.

BRIEF DESCRIPTION OF THE DRAWINGS

The following drawings form part of the present specification and are included to further demonstrate certain embodiments. Some embodiments may be better understood by reference to one or more of these drawings alone or in combination with the detailed description of specific embodiments presented.

DETAILED DESCRIPTION

In some embodiments, the virtual hunting device includes components that simulate or imitate a firearm, such as a stock, barrel, trigger, etc. In other embodiments, the virtual hunting device incorporates an actual firearm. Thus, the firearm can be a fully functional firearm or an imitation firearm or toy firearm and may be made of metal, wood, plastic, or the like.

Figure 1:
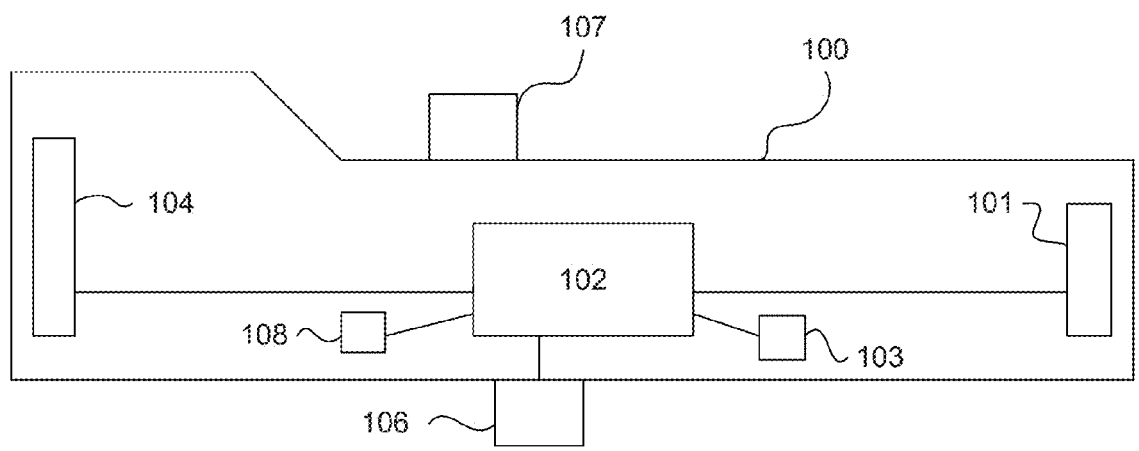
FIG. 1 depicts a first embodiment of an imaging device.
Figure 2:
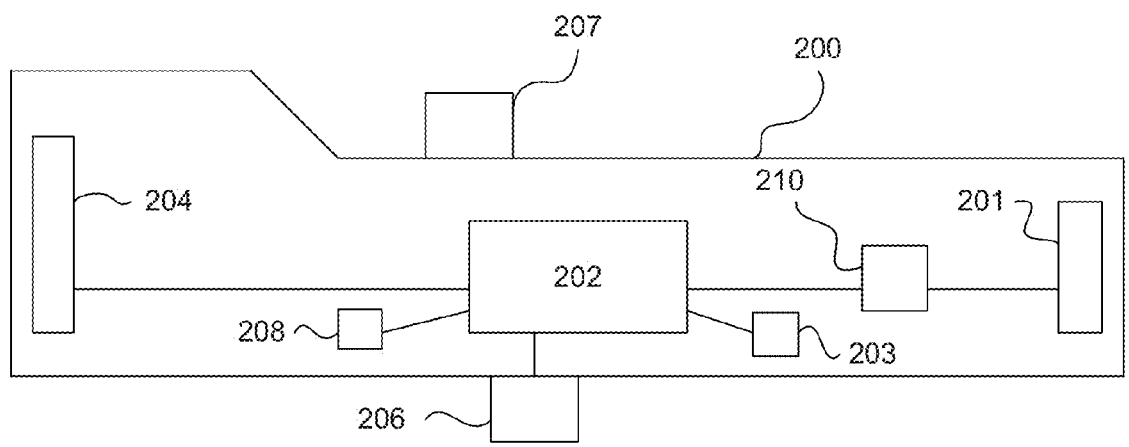
FIG. 2 depicts a second embodiment of an imaging device.

FIG. 1 illustrates an imaging device 100, according to embodiments of the present invention. The imaging device 100 may be coupled to or integrated with a scope. The imaging device shown in FIG. 1 includes a front lens 101. The front lens 101 may be made from a camera phone lens such as a standard industry phone camera lens. The imaging device 100 also includes a processing module 102, which processes light propagating through the front lens 101 to create an image. The processing module 102, in some embodiments, includes a combination of multiple components, such as a CMOS or CCD sensor, a processor, and a memory. In other embodiments, as shown in FIG. 2, a processing module 202 may be separate from an imaging sensor 210 (e.g., a CMOS sensor). Thus, the processing module 102 may use a CMOS sensor to create the image using light propagated through the front lens 101 and may store that image in the memory using the processor. Thus, if a user points the imaging device 100 at an animal, an image of that animal may be created via the front lens 101 and the processing module 102.

The imaging device 100 also includes a multi-use hook up portal 103, which can be used to transfer data to or from an external device. For example, images stored in the memory may be transferred to an external device, such as tablet computers, Kindles, laptops, home computers, cell phones, etc., or images from those external devices may be uploaded to the memory of the imaging device 100. Multi-use hook up portal 103 may use a variety of transmission protocols and physical interface formats. For example, the portal 103 may include, for example, a USB port or may support, for example, memory cards. Thus, data such as photos, videos, or movie clips can be transferred to the imaging device 100.

Figure 3:
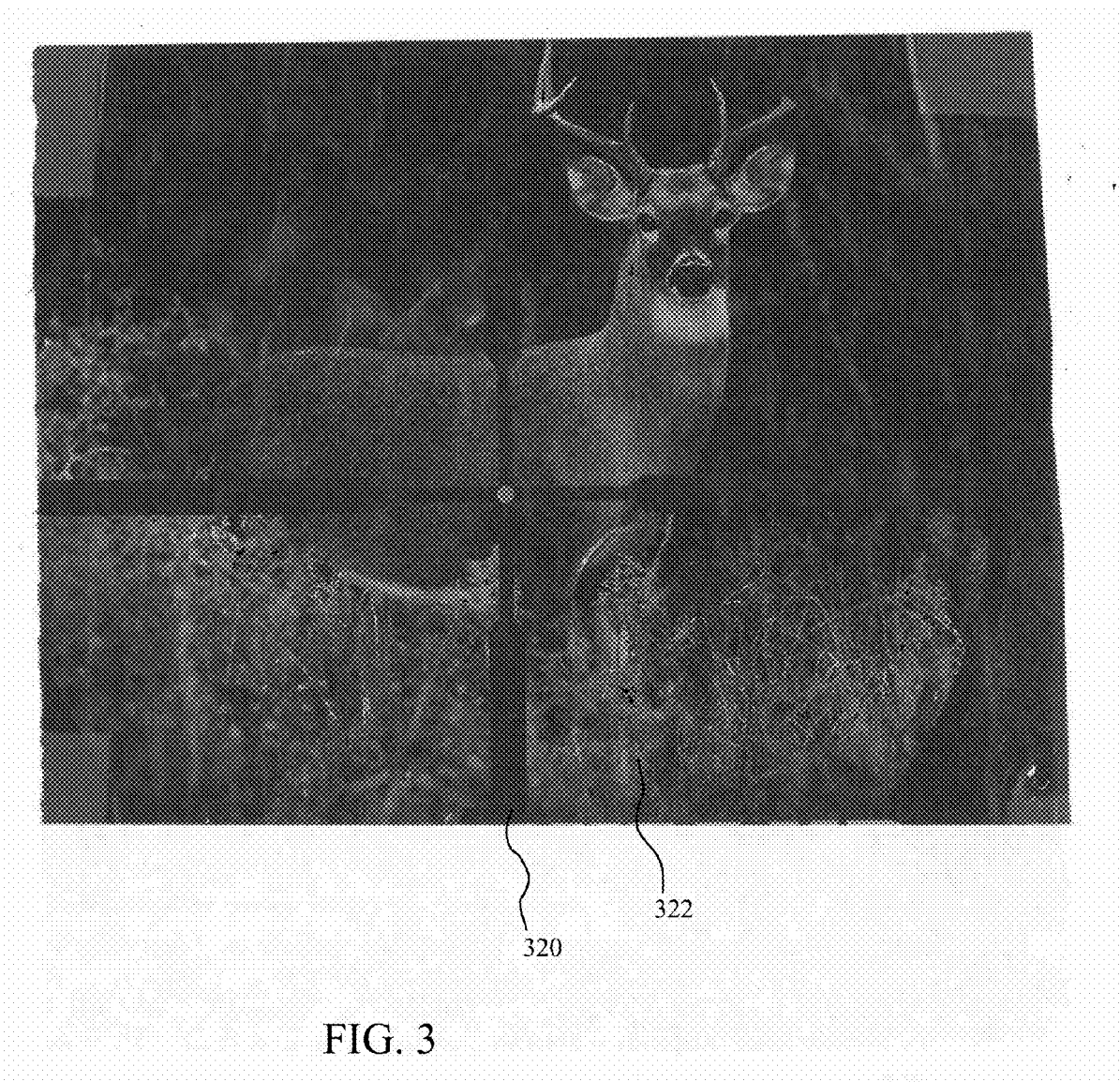
FIG. 3 depicts an exemplary depiction of an image that may be displayed on a viewing screen.
Figure 4:
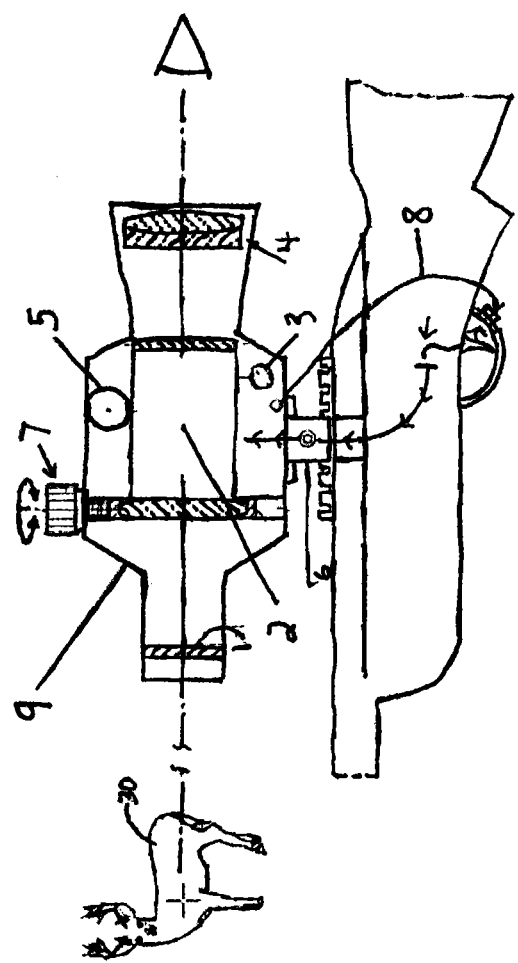
FIG. 4 depicts an imaging device coupled to a firearm.

The images stored in the memory and/or processed by the processing module 102 are transferred and displayed on a viewing screen 104. The viewing screen 104 may be any one of a number of screens, such as a touch screen, an LCD screen, an LED screen, an industry standard phone camera viewing screen, or the like. Thus, the captured image of an animal may be presented on the viewing screen 104. In addition, in some embodiments, the viewing screen 104, either alone or in combination with the processing module 102, superimposes images or other indicia on the displayed images. For example, the processing module 102 may instruct the viewing screen 104 to apply a bull's eye to an image transmitted from the processing module 102. In other embodiments, the processing module 102 automatically superimposes the bull's eye or other indicia on the captured image and stores the entire image in memory. In some embodiments, the processing module 102 provides a selection of indicia to add to the images. For example, the processing module 102 may provide a variety of bull's eye selections to a user via the viewing screen 104. A user selects a particular indicia using user input means (e.g., icons on a touch screen or separate push buttons) incorporated into the viewing screen 104. Icons representing these selections, such as a bull's eye selection or videos, may be seen on the viewing screen 104. Thus, in response to a user selecting a particular bull's eye selection via the viewing screen 104, the processing module adds (e.g., superimposes) the selected bull's eye onto an image, for example, the captured image of the animal. An exemplary image is shown in FIG. 3, in which a cross-hair 320 is superimposed on a captured image 322 of an animal.

In some embodiments, the imaging device 100 is set up to capture an image or to display an image when the trigger of the firearm or imitation firearm is pulled. For example, when the trigger of the fake rifle or gun is pulled, a photo of the targeted animal is shot without discharging a bullet at the animal. Alternatively, the shooter can choose to watch a video or a movie clip that has been transferred to the imaging device 100. For this purpose, in some embodiments the imaging device 100 has an insert connection 106, which may be used to transfer a trigger signal to the processing module 102. In other embodiments, the insert connection 106 is custom made to fit into a customized rifle. The insert connection completes circuit internally from the trigger (or from a separate detection circuit near the trigger) to the processing module 102 to take photos. In addition, or alternatively, the imaging device 100 may include an exterior trigger cable port 108. The exterior trigger cable port 108 accepts a custom cable which clips on behind the trigger of a random fake rifle or gun at one end. The custom cable is plugged into the exterior trigger cable port 108 at the other end. As a result, pulling the trigger sends a signal through the trigger cable port 108 to the processing module 102, which then captures an image and/or displays that image, another image, a video, or a movie clip using the viewing screen 104. An exterior trigger cable port 108 is useful for fake rifles or guns (e.g., toy guns and rifles, soft air rifles, and BB guns) that are not custom made to accept the insert connection 106.

A battery holder 107 is provided to hold batteries that supply power to the processing module 102 to take photos or apply applications such as playing a video. As mentioned above, photos taken by the imaging device 100 may be transferred to any external device that can accept data from outside.

As discussed above, embodiments of the invention may be used to hunt virtually. The virtual hunting apparatus can be used by a shooter to target an animal. By pulling the trigger of the fake rifle or gun, the shooter takes a photo of the animal or watches a video or a movie clip played by the imaging device 100. Videos and movie clips can be transferred to the c imaging device 100 by the choice of the hunter. The hunter can also apply a bull's eye to the viewing screen 104 of the imaging device 100 and/or the photo taken by pushing an application button of the bull's eye selection. For example, the shooter virtually hunting an animal may wish to view a video of a real hunt of the animal upon pulling the trigger of the fake rifle or gun of the virtual hunting apparatus to experience a kill but without actually hurting the animal. Videos provided to the imaging device 100 may be a personal choice for a hunter who hunts virtually. Instead of playing a video, a video of a target animal may be taken by the imaging device 100 if it is desired by the hunter.

Embodiments of this application may be used with imitation or toy devices, compact cameras such as a cell phone camera, and/or telescopic imitations or toy firearm scopes/sights integrated with a compact digital camera. In certain embodiments, a camera of the present invention can be used to photograph a target at the instant the target is fired upon. To configure the firearm for photography and simultaneous firing, the camera and/or scope/camera combination can be placed on the firearm in the same manner as a conventional scope. Photographs can be recorded, alternatively, in response to the sound of, or the recoil from, the firearm triggering device. An alternative embodiment eliminates the scoping component, but maintains all of the digital photography components, for example for use on smaller imitation firearms.

As also discussed above, in some embodiments, the virtual hunting apparatus employs a camera or image recording device mounted on top or to the side of the firearm. The trigger of the firearm is operably connected to a camera and when initiated by a hunter, a real-time image is recorded. A processing module or photo sensor of the camera can be connected by a cable that links the trigger to the camera. Some embodiments of the present invention concern recording a photo of the target instead of firing a bullet or pellet. Alternatively, the camera may record a video or a short clip of a targeted animal, upon initiation of the trigger. A firearm of certain embodiments herein includes but is not limited to, a real gun, a toy gun such as a toy rifle, air gun, pellet gun, or an air soft gun, or other simulated guns known in the art. The camera can be a device similar to a compact, lightweight cell phone camera or digital camera or other image recording device such as used in an operating room on the end of a catheter to scope and record real-time images. In some embodiments, applications programmed into the camera can be used to enhance the virtual hunting experience such as including a variety of target selections having a bull's eye and means known in the art to apply the target to the images recorded by the device. In other embodiments, an imaging device is further provided with a variety of videos, such as a real animal being shot, and means for playing the videos. In yet other embodiments, the imaging device displays a movie clip that the hunter wishes to view and plays the movie clip upon actuation of the trigger of the fake rifle or gun. To further enhance the hunting simulation, the firearm or imitation firearm may be equipped with a speaker to emit a firing sound when the trigger is pulled and/or other hunting-related sounds. The firearm or imitation firearm may further include vibration components to mimic the kickback that normally occurs when firing a firearm in order to provide the hunter with a more satisfying hunting experience. The amount of kickback may vary to imitate various firearms and ammunitions.

In yet other embodiments, an apparatus of the instant invention can be used to train a hunter or law enforcement officer where the apparatus can be used anywhere and remain safe yet an effective training tool.

What is claimed is:

1. A virtual hunting apparatus comprising:
   a barrel;
   a trigger; and
   an imaging device coupled to an external surface of the barrel, the imaging device comprising:
      a front lens,
      a viewing screen,
      a multi-use hook up portal;
      a memory for storing various videos; and
      a processing module coupled to the viewing screen, and to the multi-use hook up portal, wherein the processing module is configured to receive light propagated through the front lens, generate an image using the received light, and to display the image on the viewing screen;
   wherein the processing module is configured to display a stored video on the viewing screen; and
   wherein the processing module records the image and displays the stored video in response to a trigger signal.

2. The virtual hunting apparatus of claim 1, wherein the imaging device includes an exterior trigger cable port configured to communicate the trigger signal to the processing module.

3. The virtual hunting apparatus of claim 1, wherein the barrel and the trigger of the virtual hunting apparatus are configured to imitate at least one of the following: an imitation firearm, a toy firearm, and a real firearm.

4. The virtual hunting apparatus of claim 1, further comprising a push button application for a bull's eye selection, wherein upon activation the viewing screen applies the selected bull's eye to the image.

5. The virtual hunting apparatus of claim 1, wherein the imaging device includes vibration components to mimic a kickback.

6. The virtual hunting apparatus of claim 1, wherein the imaging device includes a speaker.

7. The virtual hunting apparatus of claim 1, wherein the barrel and the trigger are a barrel and a trigger from an actual firearm.

8. A virtual hunting kit comprising:
    a trigger clip configured to couple to a trigger of a firearm and to generate a trigger signal upon activation of the trigger;
    an imaging device configured to be coupled to a dorsal side of a barrel and operatively coupled to the trigger clip, the imaging device comprising:
        a front lens,
        a viewing screen,
        a multi-use hook up portal;
        an external trigger cable port configured to receive the trigger signal from the trigger clip;
        a memory for storing various videos; and
        a processing module coupled to the viewing screen, to the multi-use hook up portal, and to the external trigger cable port, the processing module being configured to:
            receive light propagated through the front lens, generate an image using the received light, and to display the image on the viewing screen; and
            upon receiving the trigger signal from the trigger cable port, record the image in memory and display a stored video in response to the trigger signal.

9. The virtual hunting kit of claim 8, wherein the trigger clip comprises:
    a trigger member configured to couple with the trigger of the firearm; and
    a guard member configured to couple with a trigger guard of the firearm.

10. The virtual hunting kit of claim 8, wherein the firearm can be one of the following: an imitation firearm, a toy firearm, and a real firearm.

11. The virtual hunting kit of claim 8, further comprising a push button application for a bull's eye selection, wherein upon activation the viewing screen applies the selected bull's eye to the image.

12. The virtual hunting kit of claim 8, wherein the imaging device includes vibration components to mimic a kickback.

13. The virtual hunting kit of claim 8, wherein the imaging device includes a speaker.

14. A method for converting a firearm into a virtual hunting apparatus, the method comprising:
    attaching a trigger clip to a trigger of the firearm, the trigger clip being configured to generate a trigger signal upon activation of the trigger; and
    attaching an imaging device to a dorsal side of a barrel of the firearm, the imaging device comprising:
        a front lens,
        a viewing screen,
        a multi-use hook up portal;
        an external trigger cable port configured to receive the trigger signal from the trigger clip;
        a memory for storing various videos; and
        a processing module coupled to the viewing screen, to the multi-use hook up portal, and to the external trigger cable port, wherein the processing module being is configured to:
            receive light propagated through the front lens, generate an image using the received light, and to display the image on the viewing screen; and
            upon receiving the trigger signal from the trigger cable port, record the image in memory and display a stored video in response to the trigger signal.

15. The method of claim 14, further comprising a step of actuating the trigger of the firearm, causing the trigger clip to communicate the trigger signal through the external trigger cable port to the processing module and thereby causing the processing module to record the image and substitute the image on the display screen to the stored video.

* * * * *